United States Patent [19]

McLey

[11] 4,362,934

[45] Dec. 7, 1982

[54] VELOCITY SENSING DEVICE USING OPTO-ELECTRONIC SWITCHES

[75] Inventor: David M. McLey, Scarboro, Canada

[73] Assignee: Syntronics Music Corporation, Toronto, Canada

[21] Appl. No.: 252,143

[22] Filed: Apr. 8, 1981

[51] Int. Cl.³ .......................... G10C 3/12; G01D 5/34

[52] U.S. Cl. ....................................... 250/229; 84/1.1; 84/1.27; 84/DIG. 7; 84/423 R; 84/433; 250/551; 307/311; 340/365 P

[58] Field of Search .................... 84/1.1, 1.27, 4.23 R, 84/433, DIG. 7; 250/229, 551; 307/311; 340/365 P

[56] References Cited

U.S. PATENT DOCUMENTS

| | | | |
|---|---|---|---|
| 3,617,627 | 11/1971 | McLean | 340/365 P X |
| 4,301,704 | 11/1981 | Nagai et al. | 84/1.1 X |

*Primary Examiner*—Stanley J. Witkowski
*Attorney, Agent, or Firm*—Westell & Hanley

[57] ABSTRACT

A musical synthesizer keyboard has a plurality of keys mounted so that each key may be displaced along and return along a locus of movement and where during travel in either direction along said locus a key causes a change of state in each of two corresponding optical detectors at spaced locations along said locus. Means are provided for signalling the states of the detectors to other equipment.

10 Claims, 9 Drawing Figures

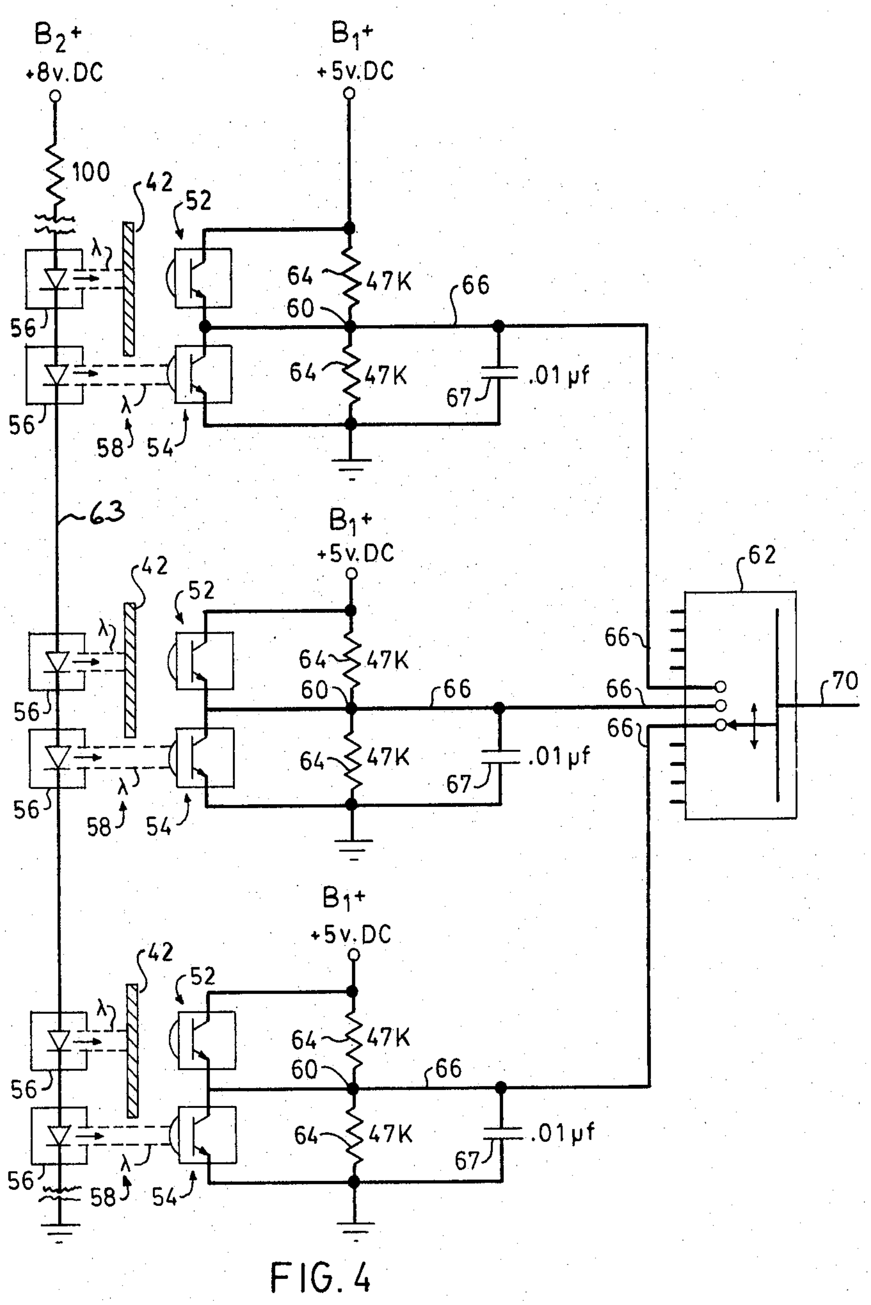
FIG. 4
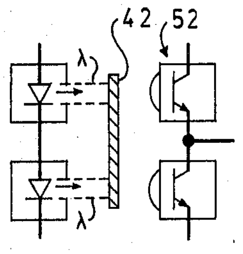
FIG. 5
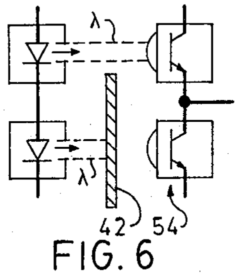
FIG. 6
FIG. 7
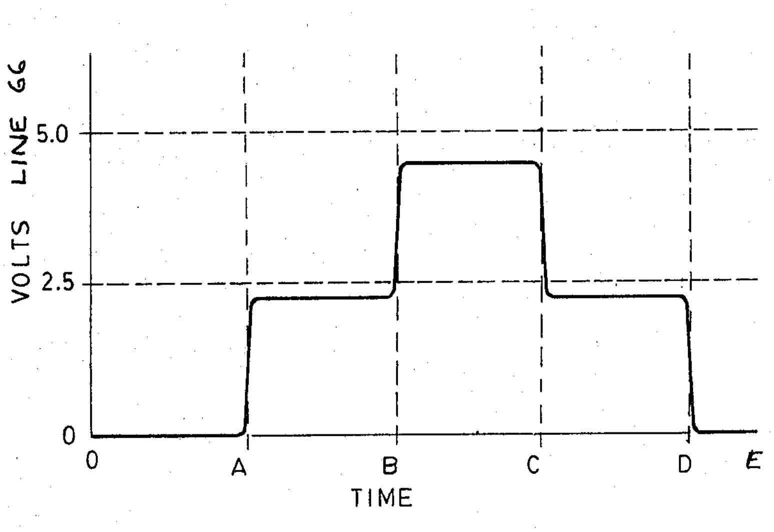

VELOCITY SENSING DEVICE USING OPTO-ELECTRONIC SWITCHES

This invention relates to a keyboard for production of musical notes.

The type of keyboard with which the invention is concerned will commonly resemble a piano keyboard but in any event will comprise a plurality of keys, reversibly movable along a locus, e.g. which may be depressed from a quiescent position and returned thereto.

The movement of a key is not used to produce sound directly but rather the movement or displacement of the key is signalled to another device. The other device, for example, a computer will be used to control means for producing the musical note. The signal to the other device will carry information as to the key depressed and information as to the force or velocity of depression and the duration for which the note is to be maintained. With such information the receiving device is designed to operate means to produce the musical note identified by the key (with or without harmonics or chords) with an amplitude or other characteristic determined by the force or velocity caused by depression of the key. However, the operation of the device for receiving the signal and the means for producing the musical sound form no part of the present invention.

It should also be noted that although the sounds produced may be that of a piano, there is no limitation in this regard. Depending upon the capacity of the receiving device and its connected sound producing equipment, the musical notes produced may correspond to any instrument or quality of sound.

Prior keyboards have been designed to signal the force (or velocity) of depression of the key in various ways. Thus a number of switch designs have been used to signal the displacement from and/or return of the key to its quiescent position and thus to produce a signal identifying its intended duration of the note. To signal the desired amplitude of the note, pressure transducers have been used to signal the force or velocity of depression of the key. However, such pressure switches have been subject to an unduly wide variation in response, are relatively insensitive to changes of pressure and have been subject, in use, to high wear and tear and changes in response.

It is an object of this invention to provide a keyboard where each of a plurality of keys may be displaced along and may return along a locus of movement and where during travel in either direction along said locus a key causes a change of state in each of two corresponding optical detectors at spaced locations along said locus.

The time interval between changes of state at the spaced locations is an inverse function of the force or velocity of depression of the key. Moreover the time between a change of state on travel of the key in the initial direction and a change of state on travel of the key in the return direction will give a measure of the desired duration of the note identified with the key. Thus the key, cooperating with the two optical detectors provides information for signalling the amplitude or other quality and duration of a musical note. The identity of the keys in the preferred embodiment is provided for by having a separate line corresponding to each key.

The use of spaced detectors renders signalling of the above information convenient. The use of optical detectors gives relatively precise indications of the change of state and the use of optical detectors significantly reduces wear and tear and the tendency of a change in response in the detectors.

It is an object of the invention to provide a keyboard where each of a plurality of keys is combined with detecting means to detect the passage of a key at a pair of locations along the key travel, whereby a signal may be provided indicating the velocity of the key.

It is an object of this invention to provide a keyboard where each of a plurality of keys may be displaced along and may return along a locus of movement and where during travel in either direction along said locus a key causes a change of state in each of two detectors at spaced locations along said locus.

It is an object of this invention to provide a keyboard and circuitry where the location of the keys along a locus may be signalled by discrete voltage levels which are easily detectable by a level discriminator or equivalent device.

In drawings which illustrate a preferred embodiment of the invention:

FIG. 4 shows the circuitry for signalling motion of three of the keys of the keyboard with the keys in a quiescent position, FIGS. 5 and 6 show the optical detection states for a key moved from its quiescent position, and FIG. 7 shows the electrical output for the detection circuit for a key during the complete cycle of movement of the key.

The invention relates more closely to the cooperation of the key travel with detecting means, than to the actual design of the key. However, it is thought more logical to the explanation if the specific disclosure commences with a specific description of a preferred form of key mounting mechanism.

Figure 1:
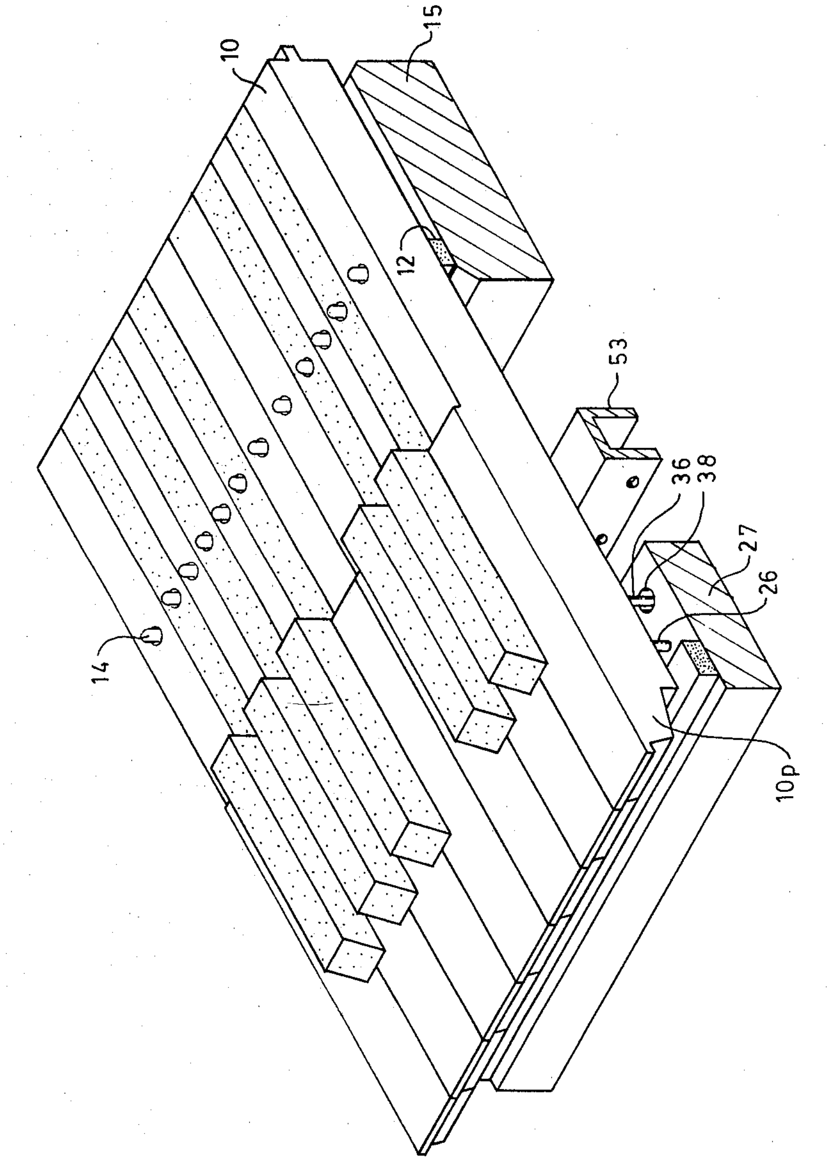
FIG. 1 shows a portion of a keyboard with which the invention may be used.

The keyboard is indicated generally in FIG. 1 showing a plurality of white and black keys arranged as in a conventional piano keyboard. For the purpose of this application it will be noted that there is no material difference between the operation of a black and of a white key.

Figures 2, 2A, 2B, 3:
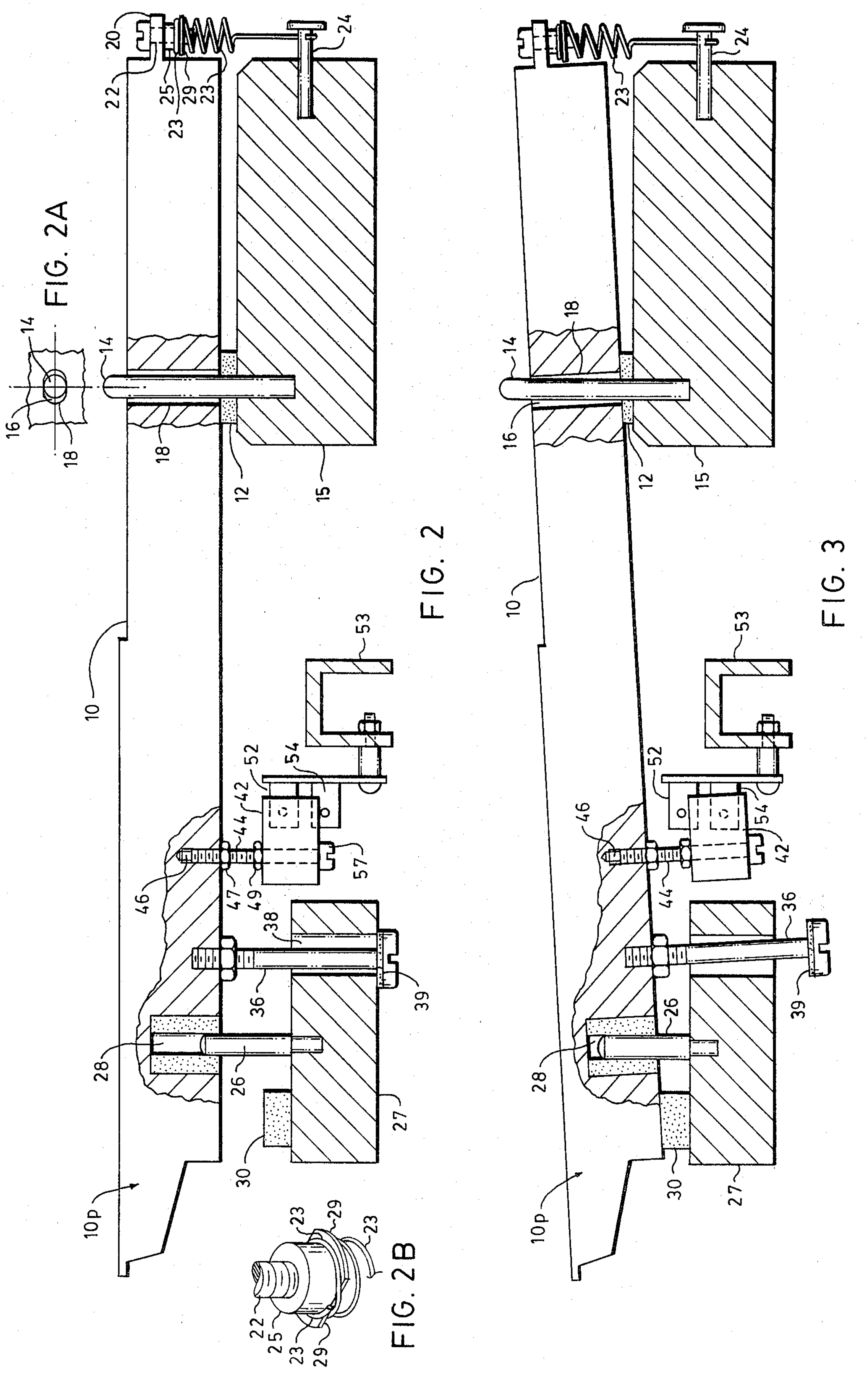
FIG. 2 shows a side view of a key in raised position.
FIG. 2A is a top view of a portion of FIG. 2.
FIG. 2B is a perspective view of a portion of FIG. 2.
FIG. 3 shows a side view of the key of FIG. 2 in lowered position.

FIG. 2 shows a side view of a key 10 in its quiescent or upper limiting position while FIG. 3 shows the same key depressed to its lower limiting position.

In FIGS. 2 and 3 the key is shown pivotted on a felt pad 12 attached to a cross member 15 of the keyboard frame which acts as a fulcrum for swinging of the key thereabout. A pin 14 extends upwardly from pad 12 through a slot 16 in the key. The slot 16 is merely wide enough, relative to the width of the pin 14 to make a sliding fit therewith. However, the slot cross-section is greater in the longitudinal direction of the key than the pin 14 to allow tilting of the key 10 relative to pin 14. (The relation of slot to key dimensions is best shown in FIG 2A.)

At the end of the key remote from the playing end there is provided a bracket 20 to which is attached a bolt 22 projecting downward and freely rotatable in bracket 20. The frame member 15 is provided with a rearwardly projecting pin 24. A tension spring 23 is connected at one end to the pin 24 and at the other end to the bolt 22 (as best shown in FIG. 2B). In the preferred embodiment a T-nut 25 on bolt 22 has a flange 29 over which the upper turn of spring 23 may be led. This is indicated in FIG. 2B. The spring 23 biases the playing end 10*p* of the key to an upward position against a stop to be described hereafter.

The key may be spring biased in the direction shown by any conventional means as an alternative to the bolt and spring shown.

The playing end 10*p* of the key biased upwardly as described, is maintained in alignment by a pin 26 projecting upwardly from cross-member 27 of the keyboard frame and sliding in a (preferably) felt lined bore 28 in key 10*p*. The depth and dimensions of the bore 28 allow the movement of the pin 26 into and out of key 10*p* over the latter's range of movement.

The range of movement of the key called the "locus of movement of the key" herein is limited in the downward direction by pad 30 located on the keyboard frame which is preferably felt covered and located to interrupt the downward movement of the key at the position shown in FIG. 3.

The upward limit of movement of the key 10*p* utilizes a bolt 36 downwardly projecting from key portion 10*p* loosely through a wide bore 38 in frame member 27. The head 37 of bolt 36 located below the keyboard frame is padded at 39 and adjustable to bear on frame member 27 and set a limit for the upward excursion of the key, under the bias of spring 23. The wide bore 38 allows ample clearance for movement of the bolt 36 therethrough.

It will be noted that obvious design alternatives will be available where the functions of pin 26 in aligning the key and bolt 36 in limiting its upward excursion may be combined. Further the invention is concerned with the sensing of key displacement or velocity and any method of key alignment and excursion limiting is considered within the scope of the invention.

Operation of the displacement and velocity sensing over the key excursion demonstrated by FIGS. 2 and 3 is illustrated in FIGS. 4, 5 and 6.

As illustrated in FIGS. 2 and 3 a 'flag,' here in the form of a flat thin plate 42 is attached to the key to depend therebelow and move therewith. For adjustment purposes the flag 42 is slidably mounted on a bolt 44 which may be adjusted in depth in a threaded bore 46 in the key bottom. Lock nut 47 fixes the bolt 44 in relation to key 10 and nut 49 clamps flag 42 against head 57 of bolt 44. The clamping pressure of nut 49 is sufficient to prevent accidental rotation of flag 42 on bolt 44 but if desired the flag 42 could be keyed to the bolt.

A pair of optical switches 52 and 54 are provided for each key mounted on a channel 53 forming part of the frame. Each of such switches comprises, a LED (light emitting diode) 56 on one side of a slot 58 and an optically operable transistor type device 52 or 54 on the other. For the transistor type device I prefer to use CLI—800 opto switches manufactured by Clairex Corp. of 560 S. Third Ave., Mount Vernon, N.Y., 10550. With the proper voltages across the emitter-collector terminals of the transistor type device, the emitter-collector circuit will assume a conducting or non-conducting state depending upon illumination or not by the LED. Obviously alternate light sources to the LED's may be used for actuating the optical switches.

FIG. 4 shows the optical switches and circuitry corresponding to three of the keys 10 which are identified in FIG. 4 only by their flags 42. In FIG. 4 all flags 42 are in their position corresponding to the rest or quiescent position of the corresponding key 10. FIGS. 5 and 6 show other positions of the flag corresponding to the lower key in FIG. 4.

The optical switches 52 and 54 each define a slot or gap 58 through which the flag 42 can pass in its travel in accord with the excursion of the attached key between its limiting positions. As indicated in FIGS. 4–6 each switch defines an optical path wherein, with the LED lit and the path uninterrupted, the corresponding emitter-collector is conducting, but interrupted, it is not.

As also indicated in FIG. 4 the switches 52 and 54 are arranged so that in the raised position of a key the emitter-collector path of switch 54 is conducting, that of switch 52 is not. As FIG. 5 indicates in the intermediate position of a key, neither emitter-collector conducting path (of switch 52 or 54) is conducting while in the depressed position of the key (FIG. 6), switch 52 is conducting, switch 54 is not.

FIG. 4 also shows circuitry for operation with the optical switches. In the Figure, the LED's 56 of each pair of photo transistors 52 are energized by the $B_{2+}$ and ground connection shown.

The LED energizing circuit 63 of FIG. 4 is broken to indicate that the LED's corresponding to key circuits not shown, are also connected in series between the source $B_2$ + and ground. Obviously the LED's may be energized in separate circuits or in smaller groups if such arrangement is found more advantageous.

The emitter-collector circuits of the corresponding transistors are connected in series as shown between $B_{1+}$ and ground. The connection between the paired transistor circuits at node 60 is connected by line 66 to the input of an analogue multiplexer 62. A resistor 64 is connected in parallel with each of the emitter collector circuits.

A capacitor 67 is connected from line 66 to ground. For the preferred CLI—800 opto transistors and the circuit shown, exemplary values of the voltages, capacitances and resistances are indicated. Such values are not, of course, intended to be limiting.

In operation, and as indicated in FIG. 7, with a flag 42 in the position of FIG. 4, switch 52 is open, switch 54 is closed and the output on line 66 is approximately OV, (OV, modified by the drop while connecting of switch 54) (domains OA and DE on the graph). With the key in the intermediate position (FIG. 5) neither switch 52 nor 54 conducts and the output line potential will be determined by the resistances 64 and will reach a voltage of 2.2–2.8 (approximately 2.5 V) (domain AB and CD in FIG. 7). In the fully depressed position of the key (FIG. 6) the switch 52 conducts and the switch 54 does not so that the potential at the output line will be approximately 4.5 volts (5 volts, modified by the drop, while conducting, in switch 52) (domain B–C on FIG. 7).

As will be appreciated, the sequence of operation of the optical switches is reversed when the key is released.

Thus the overall voltage on each output line on the depression of a key is indicated by the graph of FIG. 7. For the depression of a key the graph is read from left to right from O to a little to the right of B and for the release or raising of a key, the graph is read from left to right from a little to the left of C to E.

The information on an output line 66 may be sensed in a great number of ways obvious to those skilled in the art. A method we prefer is that of an analog multiplexer schematically indicated at 62 which sequentially connects each of the output lines 66 to line 70 to means for determining the state of the key.

The multiplexer 62 schematically indicates a sliding contact 63 for connection of line 70 to each of the lines 66 in turn. However, it should be realized that this is only a schematic indication and that the sequentual connection of each of the lines 66 to the line 70 will preferably and in some cases necessarily be accomplished by electronic switching. Exemplary times for such switching involve the fact that the fastest time for key depression is approximately 5 miliseconds (0.005 sec). The preferred sampling time per line is 5 microseconds (0.000005 sec). With 61 lines the sampling cycle of the lines will be 305 microseconds (0.000305 sec). Thus a rapidly struck key would be sampled approximately 17 times during its descent and a larger number of times during a slower descent or any ascent.

It is noted that in addition to the key velocity the key must be identified. This is not part of this invention. However, it is noted that the preferred method of identifying individual lines 66 utilizes the fact that the control (not shown) sends signals to multiplexer 62 to identify the line 66 to be scanned. Such identifying signals are also sent to the device receiving the signals resulting from the scanning and identify such signals with the line scanned.

Alternatively each output line 66 for a key 10 may be connected to a receiver by an individual line although this is not preferred. With such information the device receiving the information can determine the periods OA, AB, BC, CD, DE.

Although the intervals OA, AB, BC, CD and DE are indicated as approximately equal in FIG. 7 there is no such necessary equivalence as these periods will vary widely with the use of the keys and the velocity of depression. Thus the period OA is a function of the period the key is quiescent, the period AB is an inverse function of the velocity of depression of the key. The period BC is a function of the time the key is held down while the period CD is an inverse function of the time to raise the key, usually under the control of spring 23.

The periods OA and DE correspond to the period in which the note is unplayed. The duration of the period AB bears an inverse relationship to the velocity of depression of the key and may be used in another device in the synthesis of the amplitude or other quality of sound. Any of the periods A–C, A–D, B–C, B–D may be used to indicate the duration for which the note is to be maintained. The periods C–D may be used to indicate the rate of diminishment of the note or other information.

The purpose of the capacitor 67 is to provide a ground to transients which may appear on the line 66 due to one or a number of reasons including switching and the characteristics of the device connected at the reception end.

It is noted that the change of state of a pair of optical switches available for signalling to a sensor or receiver is the critical factor and that the circuitry shown in FIGS. 4 is only one way of performing the operation. It will be obvious that, within the scope of the invention the flag may be of more complex or of different design and the direction of the change of state of one or both optical switches may be reversed during the depression of the key, i.e. during such depression the flag may be designed to convert switch 52 from a conducting to a non-conducting state and/or the switch 54 from a non-conducting to a conducting state.

(Obviously these changes will be reversed when the key returns to the former position).

The use of discrete voltage levels to respectively identify the upper, middle and lower extends along the locus of key movement provides an output along line 66 and, during sampling, along line 70 which is very suitable for detection by a level discriminator or equivalent device for use by the device for synthesizing the note.

I claim:

1. Keyboard for production of musical notes, comprising:

a plurality of keys, a pair of optical detectors corresponding to each key, each key being reversibly movable along a locus relative to said keys, from one end of said locus past a first location on said locus, past a second location to the other end of said locus, cooperating means associated with each key and one of said corresponding detectors to cause a change of state of said one of said detectors when said corresponding key moves past a first location on said locus, cooperating means associated with each key and the other of said corresponding detectors to cause a change of state of said other of said detectors when said corresponding key moves past a second location on said locus.

2. Keyboard as claimed in claim 1 in combination with circuitry designed to detect and signal the state of each of said detectors.

3. Keyboard as claimed in claim 1 wherein each of said detectors is a solid state optical switch.

4. Keyboard as claimed in claim 2 wherein each of said detectors is a solid state optical switch.

5. Keyboard as claimed in claim 1 including circuitry corresponding to each key connected to detect the state of the corresponding optical detectors and connected to an output line, said circuitry being designed to provide at said output line, a first voltage level when said key is between said one end of said locus and said first location, a second voltage level when said key is between said first location and said second location, and a third voltage level when said key is between said second location and said other end of said locus.

6. Keyboard as claimed in claim 2 including circuitry corresponding to each key connected to detect the state of the corresponding optical detectors and connected to an output line, said circuitry being designed to provide at said output line, a first voltage level when said key is between said one end of said locus and said first location, a second voltage level when said key is between said first location and said second location, and a third voltage level when said key is between said second location and said other end of said locus.

7. Keyboard as claimed in claim 3 including circuitry corresponding to each key connected to detect the state of the corresponding optical detectors and connected to an output line, said circuitry being designed to provide at said output line, a first voltage level when said key is between said one end of said locus and said first location, a second voltage level when said key is between said first location and said second location, and a third voltage level when said key is between said second location and said other end of said locus.

8. Keyboard as claimed in claim 4 including circuitry corresponding to each key connected to detect the state of the corresponding optical detectors and connected to an output line, said circuitry being designed to provide at said output line, a first voltage level when said key is between said one end of said locus and said first location, a second voltage level when said key is between said first location and said second location, and a third voltage level when said key is between said second location and said other end of said locus.

9. Keyboard for production of musical notes comprising:

a plurality of keys, a pair of optical detectors corresponding to each key, each key being reversibly movable along a locus relative to said keys, from one end of said locus past a first location on said locus, past a second location to the other end of said locus, cooperating means associated with each key and one of said corresponding detectors to cause a change of state of said one of said detectors when said corresponding key moves past a first location on said locus, cooperating means associated with each key and the other of said corresponding detectors to cause a change of state of said other of said detectors when said corresponding key moves past a second location on said locus.

10. Keyboard as claimed in claim 9 including circuitry corresponding to each key connected to detect the state of the corresponding optical detectors and connected to an output line, said circuitry being designed to provide at said output line, a first voltage level when said key is between said one end of said locus and said first location, a second voltage level when said key is between said first location and said second location, and a third voltage level when said key is between said second location and said other end of said locus.

* * * * *